United States Patent [19]
Szepesi et al.

[11] Patent Number: 5,498,995
[45] Date of Patent: Mar. 12, 1996

[54] SHORT CIRCUIT FREQUENCY SHIFT CIRCUIT FOR SWITCHING REGULATORS

[75] Inventors: Thomas Szepesi, San Jose; Hendrik Santo, Milpitas, both of Calif.

[73] Assignee: National Semiconductor Corporation, Santa Clara, Calif.

[21] Appl. No.: 355,427

[22] Filed: Dec. 13, 1994

Related U.S. Application Data

[63] Continuation of Ser. No. 32,501, Mar. 17, 1993, abandoned.

[51] Int. Cl.$^6$ .............................. H02M 3/335; G05F 1/10
[52] U.S. Cl. ....................... 327/538; 327/540; 327/541; 327/546; 327/101; 327/114; 363/21; 363/97; 331/111
[58] Field of Search .............................. 307/296.2, 296.4, 307/296.6, 296.8; 363/21, 41, 97; 327/101, 113, 114, 172, 175, 177, 531, 534, 538, 540, 541, 543, 545, 546, 427; 331/111, 177 R

[56] References Cited

U.S. PATENT DOCUMENTS

| | | | |
|---|---|---|---|
| 3,249,865 | 5/1966 | Corny .......................................... | 328/58 |
| 3,551,851 | 12/1970 | Engel ........................................ | 328/58 |
| 4,129,833 | 12/1978 | Shibata ..................................... | 331/111 |
| 4,272,690 | 6/1981 | Riney et al. ............................. | 307/265 |
| 4,318,036 | 3/1982 | Bart et al. ................................ | 315/408 |
| 4,628,433 | 12/1986 | Notohamiprodjo ....................... | 363/21 |
| 4,677,534 | 1/1987 | Okochi ..................................... | 363/21 |
| 4,714,901 | 12/1987 | Jain et al. ................................ | 331/111 |
| 4,731,720 | 3/1988 | Takahashi ................................. | 363/21 |
| 4,791,326 | 12/1988 | Vajdic et al. ............................. | 327/391 |
| 4,799,138 | 1/1989 | Chahabadi et al. ....................... | 363/21 |
| 4,806,791 | 2/1989 | Mizuide ................................... | 307/494 |
| 4,819,144 | 4/1989 | Otake ....................................... | 363/21 |
| 4,890,210 | 12/1989 | Myers ....................................... | 363/21 |
| 4,947,312 | 8/1990 | Tsuruoka et al. ........................ | 331/111 |
| 5,146,188 | 9/1992 | Suwada et al. .......................... | 331/111 |
| 5,220,203 | 6/1993 | McMorrow, Jr. et al. .............. | 307/265 |
| 5,267,133 | 11/1993 | Motomura et al. ...................... | 363/97 |
| 5,276,604 | 1/1994 | Messman ................................. | 363/97 |

FOREIGN PATENT DOCUMENTS 0059633  9/1982  European Pat. Off. .

OTHER PUBLICATIONS

Brian P. Erisman, Fernando Martin and Richard Redl, "A Novel Primary–Side Controller and an Error Signal Isolator in Low Cost Five–Pin Packages", IEEE Applied Power Electronics Conference and Expositions, Conference Proceedings 1993, pp. 369–379.

Primary Examiner—Terry Cunningham
Attorney, Agent, or Firm—Limbach & Limbach

[57] ABSTRACT

Improved controller circuitry for a switching power supply is disclosed. The switching power supply is of the type having a transformer having primary and secondary windings for generating an output voltage at the secondary winding, a power switch for driving the primary winding, and controller circuitry for activating the power switch. The improved controller circuitry includes an oscillator and frequency shift means. The oscillator generates PWM pulses having a predetermined frequency for use in activating the power switch. The frequency shift means gradually shifts the frequency of the PWM pulses at a shift rate in response to the output voltage decreasing to below a threshold level. In another embodiment, a controller for use in a switching power supply includes an oscillator for generating PWM pulses having a predetermined frequency which determine the switching condition of the supply. Frequency shift means is used gradually shifting the frequency of the PWM pulses at a shift rate in response to an output voltage of the switching power supply decreasing to below a threshold level, and programming means is used for programming the shift rate and the threshold level.

4 Claims, 9 Drawing Sheets

SHORT CIRCUIT FREQUENCY SHIFT CIRCUIT FOR SWITCHING REGULATORS

This is a continuation of application Ser. No. 08/032,501 filed on Mar. 17, 1993 now abandoned.

BACKGROUND OF THE INVENTION

1. Field of the Invention

The present invention relates to isolated offline switching power supplies, and, more particularly, to a controller for use with such power supplies which provides short-circuit protection.

2. Description of the Related Art

Most conventional off-line, isolated switching power supplies use a single controller chip located on the primary (power input/line) side of the supply. Most of these supplies couple feedback from the secondary (output/load) side of the supply to the primary side with inexpensive optical isolators operating in a linear mode. That is, the greater the drive on the optical isolator's LED, the greater the isolator's output current.

While the optical isolator approach is effective, it suffers from several disadvantages which limit performance; for example, the isolators add time constants in the control loop. In addition optical isolator performance usually degrades with time which complicates the design. Simple, general-purpose optical isolators are slow, taking approximately 0.5 us to turn on and typically over 10 times that to turn off. While high speed optical isolators may do the job, they are very expensive.

Other conventional feedback approaches carry a similar set of problems. For example, input-to-output, isolated dc-to-dc convertors control their output voltage with either a tertiary winding on the main transformer or via direct feedback from the secondary side. If the supply demands good load-regulation, direct feedback becomes mandatory. If used, converter control requires two ICs.

It is believed that linearly-operated optical couplers represent the communication link of choice from output to input. However, they need a reference and error amplifier on the secondary side. Some supplies employ an AM (Amplitude Modulation) technique which requires a more complex secondary side controller, such as Unitrode's UC1901. Both methods in effect use a chip set to control the isolated converter. In both cases the actual Pulse Width Modulation (PWM) controller resides on the primary side, but its reference and error amplifier are not used.

Both AM and linear optical coupling introduce extra time constants in the control loop. These time constants do not represent a significant problem in most of the converters available today which operate at switching frequencies between 50 and 100 kHz. However, when switching at 500 kHz to 1 MHz, which would be more desirable than the lower frequencies, the optical coupler and the output-filter time constant in the AM link can significantly limit both the control loop's speed and the transient response of the converter.

The standard 1N27 opto-coupler for example has a typical −3 dB frequency of 15–30 kHz, depending on the DC operating point. This yields a phase shift of 30 to 50 degrees at 30 kHz. Generally, a flyback converter operating at 500 kHz has a loop crossover frequency in this range. This excess phase shift forces the designer to slow down the loop by pushing down the crossover frequency below 10 kHz. In addition the typical aging of optical couplers translates into actual changes in loop gain and loop response. Such changes with time (and they also occur over temperature) accentuate the job of maintaining loop performance and stability and thus demand significant over-design of the loop.

Switching regulators which operate at high frequencies (200 kHz and up) also have problems with short circuit current limiting. Specifically, in current limit, a current sense comparator turns off the power switch as fast as possible. At low operating frequencies the speed of conventional current limit sense/comparator circuits are fast enough to ensure well controlled current limit even in output short circuit.

However, as the operating frequency increases in order to reduce overall size, the current sense delay becomes non-negligible relative to the switching period. This means that during short-circuit the duty cycle can not be decreased enough to maintain the intended current limit because the duty cycle is limited by the minimum on-time defined by the speed of the current sense/limit circuit. The result is current limit pushout in short circuit. If this phenomenon is not taken into account during design, it can easily lead to the destruction of the switching power supply.

The well-known solution to this problem is to reduce the duty-cycle during short circuit by reducing the operating frequency. Usually the frequency is reduced if the switch current reaches a second, higher current limit, in a step-wise fashion. This can yield foldback current limit which can cause startup problems, and is not always acceptable.

An existing frequency reduction circuit samples the actual switch current and optimally reduces the frequency to prevent runaway. However, this requires complex internal circuitry.

Thus, there is needed an improved control circuit for a switching power supply that will detect a short-circuit condition and reduce the frequency of the signal used to switch the power supply.

SUMMARY OF THE INVENTION

The present invention provides improved controller circuitry for a switching power supply having a transformer having primary and secondary windings for generating an output voltage at the secondary winding, a power switch for driving the primary winding, and controller circuitry for activating the power switch. The improved controller circuitry includes an oscillator and frequency shift means. The oscillator generates PWM pulses having a predetermined frequency for use in activating the power switch. The frequency shift means gradually shifts the frequency of the PWM pulses at a shift rate in response to the output voltage decreasing to below a threshold level.

In another embodiment of the invention, a controller for use in a switching power supply includes an oscillator for generating PWM pulses having a predetermined frequency which determine the switching condition of the supply. Frequency shift means is used gradually shifting the frequency of the PWM pulses at a shift rate in response to an output voltage of the switching power supply decreasing to below a threshold level, and programming means is used for programming the shift rate and the threshold level.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE PREFERRED EMBODIMENT

Figure 1:
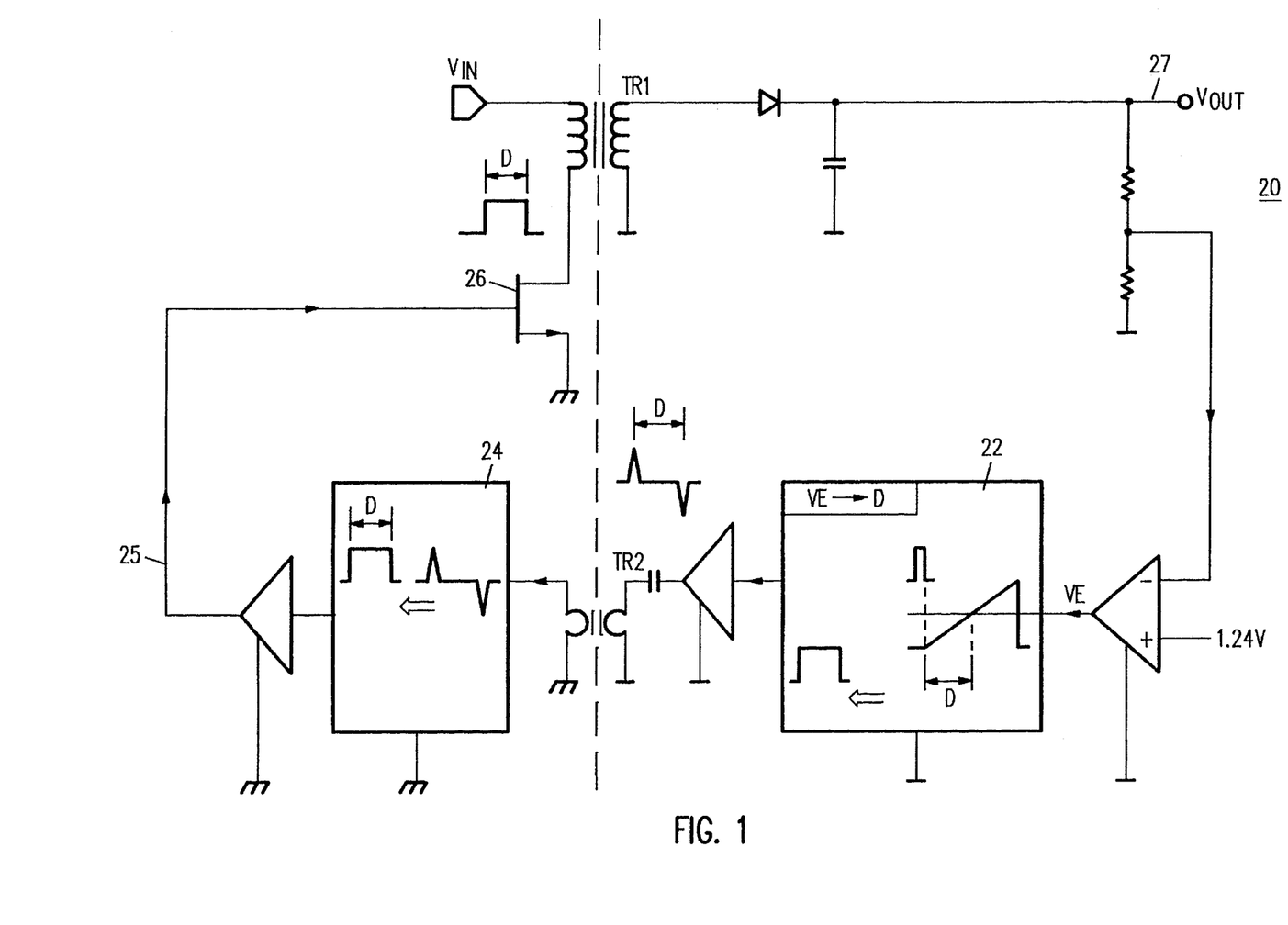
FIG. 1 is a simplified schematic diagram of a flyback voltage converter which utilizes the present invention.
Figure 2:
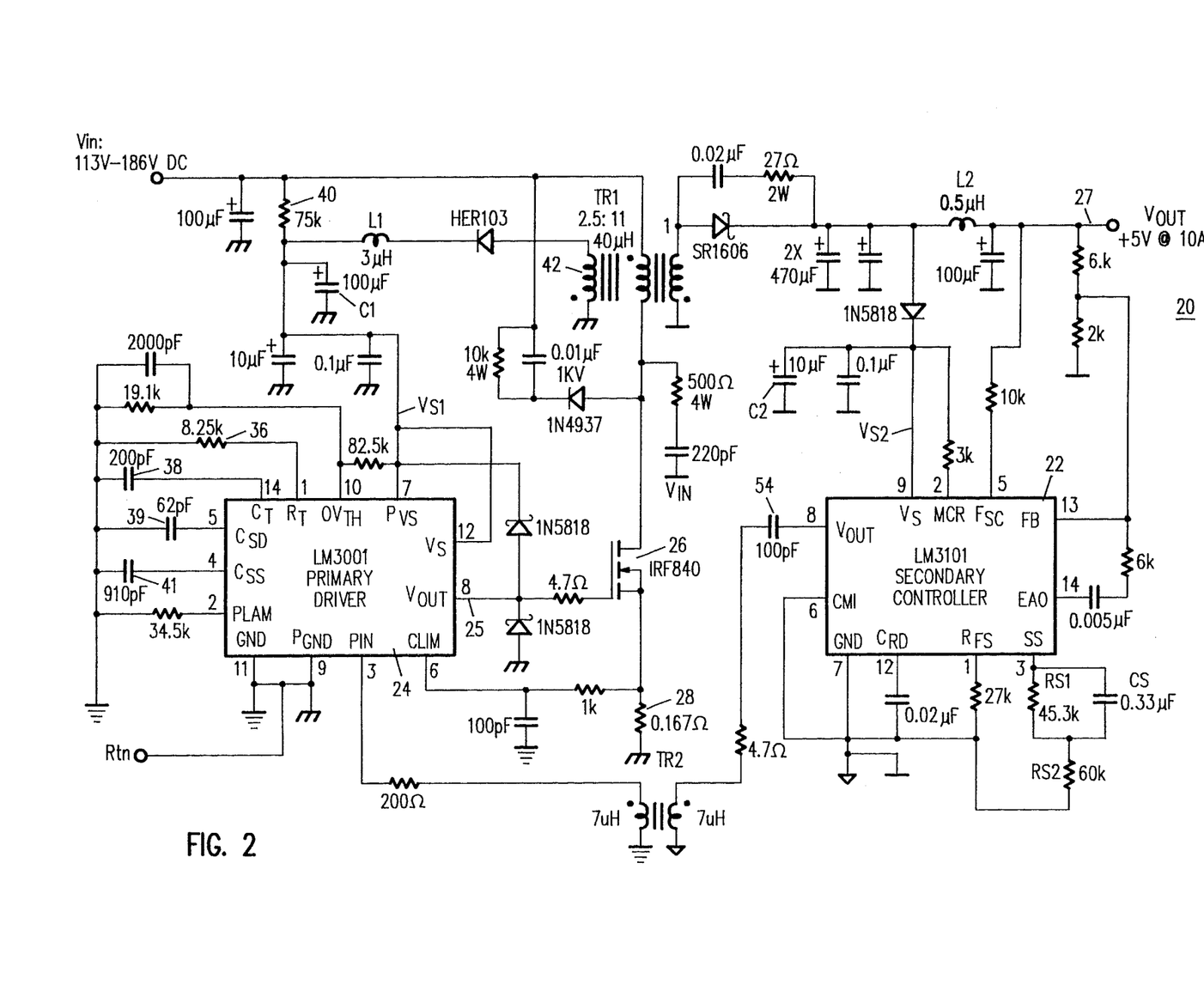
FIG. 2 is a more detailed schematic diagram of the voltage converter of FIG. 1.

FIG. 1 is a simplified schematic diagram of a 50 Watt flyback voltage converter, shown in FIG. 2, which utilizes the present invention. A secondary controller 22 and a primary driver 24 form a 1 MHz off-line Pulse Width Modulation (PWM) controller chip set with pulse communication for voltage-current-and charge-mode control. The chip set 22 and 24 not only eliminates the primary-side only controller problems, but offers increased precision and the fastest known PWM driver from a readily available controller operating at 1 MHz.

Essentially, the secondary controller 22 with its precision reference is positioned on the secondary side of the supply, close to the load. It sends raw PWM pulses back to the primary start-up-controller/driver chip 24 via transformer TR2, a tiny, inexpensive pulse transformer. As explained above, if an optical coupler were used, and run in the linear mode, it would insert a pole (a time constant) at about 50 kHz. However, feeding raw PWM from output to input via the transformer TR2 introduces neither poles nor zeros (no additional time constants) into the feedback path of the control loop. It thus yields the fastest possible loop response while also making simpler the task of ensuring that the circuit is stable regardless of line voltage, load current, time, or temperature.

When input power (Vin) is applied to the primary-side controller/driver 24 it acts like a conventional controller at startup and gets the circuit running. Powered initially with current (e.g. 200 μA) from Vin via a dropping resistor (not shown), its own oscillator and PWM generator drive the supply's MOSFET power switch 26, which drives the primary winding of transformer TR1. The pulse width modulated signal applied by MOSFET switch 26 is coupled to the secondary of transformer TR1 where it is rectified and filtered, thus building up the output voltage Vout. Primary-side driver 24 starts running when the voltage on the bootstrap winding 42 filter capacitor C1 (see FIG. 2) exceeds the under voltage lockout threshold on secondary-side controller's supply pin.

When the supply's output 27, Vout, reaches a voltage equal to an undervoltage-lockout threshold of the secondary-side controller 22, secondary-side controller 22 starts to send PWM pulses back to the primary-side driver 24 side via transformer TR2. The secondary-side controller 22 effectively takes control of the supply and the primary-side driver 24 becomes its slave. The slave's driver output 25 turns the power FET 26 on and off, only in response to PWM pulses from the secondary-side controller 22. No handshake is required between primary-side driver 24 and secondary-side controller 22, which maximizes loop bandwidth and minimizes loop response time.

The primary-side driver 24 preferably provides a complete set of typical primary-side protection features, plus a second current limit comparator which prevents short-circuit runaway. The secondary-side controller 22 preferably provides secondary-side protection including a trigger circuit for an external overvoltage crowbar.

By minimizing loop response time, the primaryside driver 24 and secondary-side controller 22 permits the design of converters capable of practical operation at PWM-switching rates above 500 kHz. A high-speed process is preferably used for integrating the driver 24 and controller 22 to form a 2-IC chip set, and allows them to operate on at least 15 Volts or more in order to achieve the slave's 24 fast drive circuit, switching rate and response time. The basic 4 μm bipolar process (called L-FAST) produces npns with an $f_t$ of 1.5 GHz and is rated at 15 V; however, careful circuit design can extend the operating voltage range of the controller 22 and driver 24 to 20 V.

The primary-side driver 24 output stage has no shoot-through and can preferably charge or discharge a 1 nF load (the input capacitance of a size 3 power FET such as an IRF730 or IRF830) from 1.3 V to 12 V faster than 20 ns.

In addition, the primary-side driver 24 preferably can drive larger (e.g., size 6) MOSFETs, or even several connected in parallel, e.g., 10-nF loads while running at 1 MHz. Rise and fall times should remain below 50 ns with the increased load. In critical applications, it should be capable of running at frequencies as high as 5 MHz.

The secondary-side controller 22 and primary-side driver 24 approach permits both designs to be optimized for their specific functions in a power supply; the primary-side driver-controller 24 for speed, the secondary-side controller 22 for precision, flexibility and special features. The controller/driver set 22 and 24 is especially suited for isolated supplies including both off-line and lower voltage units (such as telecom dc-to-dc converters running off 48 V), as well as to distributed-power applications.

The controller/driver set 22 and 24 approach is suitable for use in all popular single ended converter topologies including flyback, forward, and Cuk. The pulse transformer TR2 requires just a few turns (typically two on both primary and secondary) resulting in small size and its low cost comparable with that of the optical coupler. Moreover, while transformer communication is preferred between primary-side driver 24 and secondary-side controller 22, the secondary-side controller 22 can be used successfully with optical couplers and AM (amplitude modulation) feedback techniques.

Figure 3:
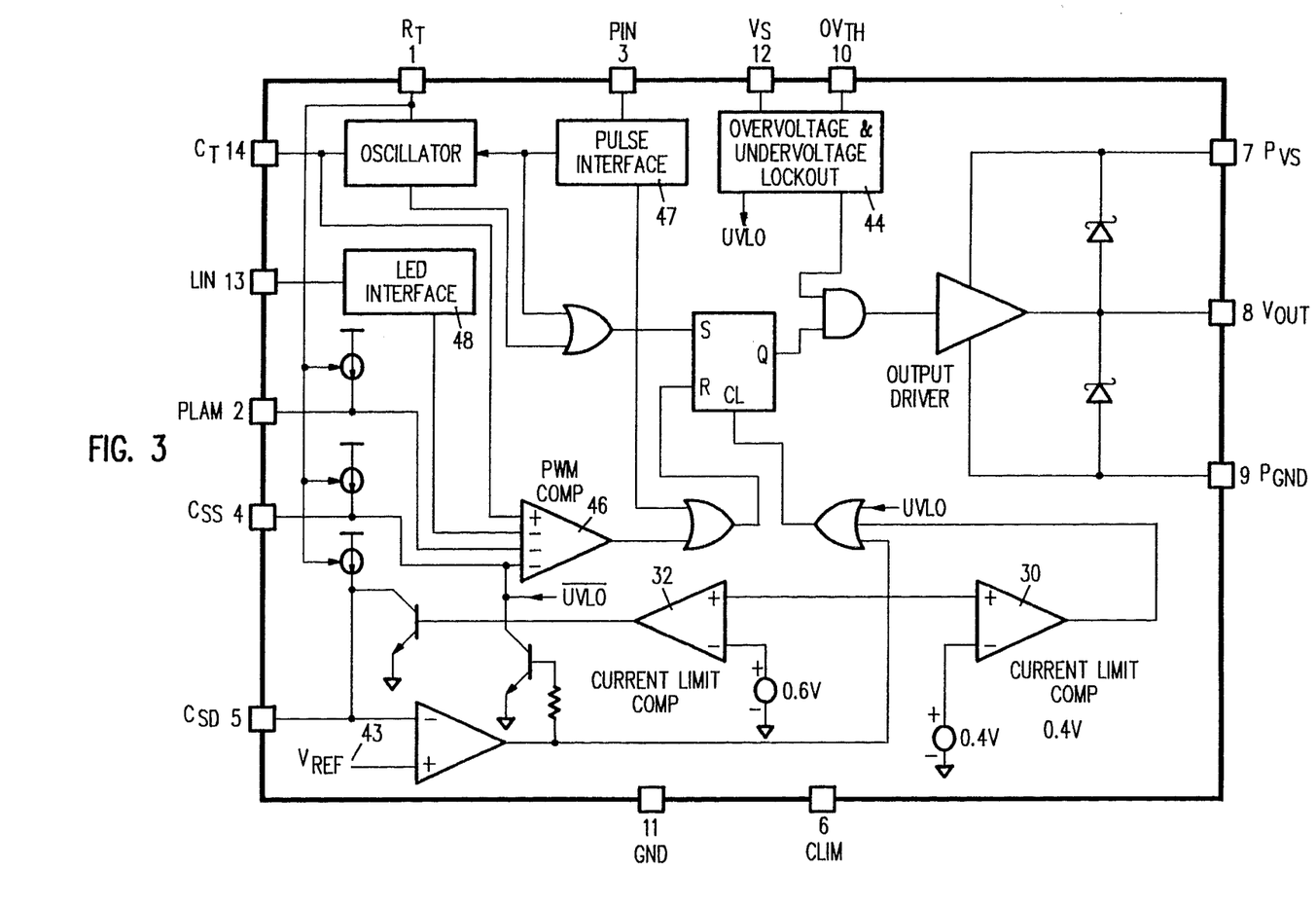
FIG. 3 is a simplified functional block diagram of primary-side driver 24.

Referring now more particularly to FIGS. 2 and 3, at start up the primary-side driver 24 runs the switching power supply in the voltage mode; however, once the secondary-side controller takes over, the supply can run either voltage or current mode. The primary-side driver 24 contains the current-limit 30. It senses the voltage across a current-sense resistor 28 in series with the FET switch 26 and triggers at a threshold of 400 mV. A second current-limit comparator 32 with a 600-mV threshold activates a timed shutdown circuit, controlled by an external capacitor 39, that eliminates the possibility of short-circuit run away.

An external resistor 36 and capacitor 38 set the switching frequency of the primary-side driver 24 between about 50 kHz and over 1 MHz. While initially powered through the dropping resistor 40, once running, the primary-side driver 24 (like the controllers in most off-line supplies), sets its supply voltage Vs1 by rectifying the output of the bootstrap winding 42 on the main transformer TR1.

It is very important that the supply behave well when the output is open or short circuited. In a short-circuit condition the supply voltage for the secondary-side controller 22, Vs2, gradually disappears due to the discharge of C2 by the chip. And when Vs1 drops to the threshold of the primaryside driver's undervoltage lockout (UVLO) circuit 44 it shuts down and draws only 200 µA, the startup current. The current from the tertiary winding starts to charge C1. In a sustained short-circuit condition the supply oscillates slowly in the startup mode, charging and discharging C1. This protects power MOSFET 26 and primary-side driver 24.

Like most controllers primary-side driver 24 sets the slew rate during startup with a soft-start capacitor. Its overvoltage shutdown circuit (not shown) can protect the chip from a supply voltage from the bootstrap winding higher than 20 V or from higher than specified maximum Vin, depending on the divider to the shutdown-input pin.

When in the no-load condition the secondary-side controller 22 stops sending pulses to the primary-side driver 24 if Vout is higher than nominal so the FET 26 is not turned on by the driver 24. The result is the so-called burst-mode or pulse-skipping operation. Now the converter operates down to zero load without the loss of regulation.

Figure 4:
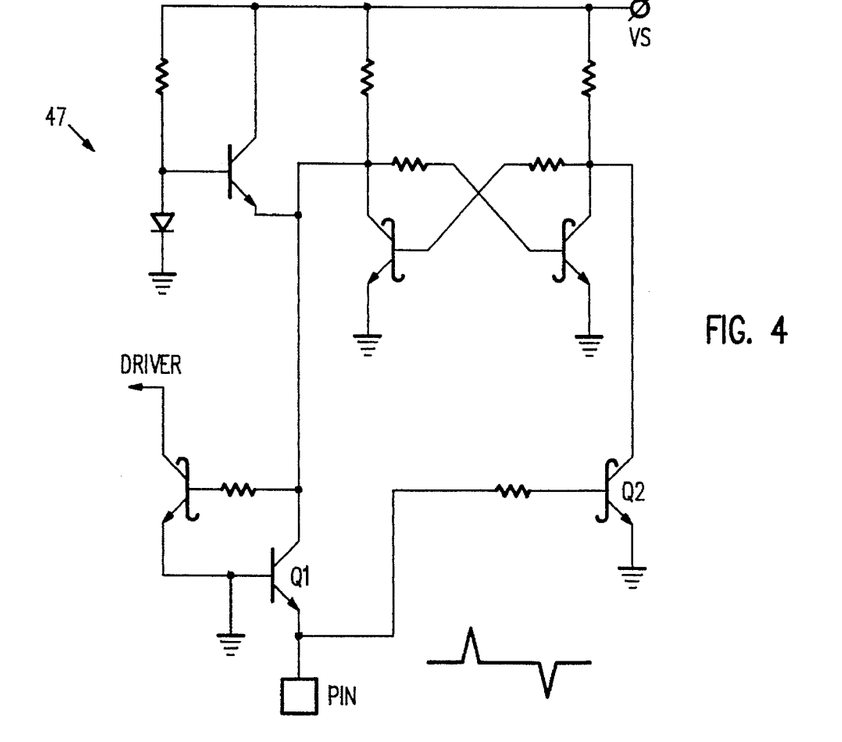
FIG. 4 is a simplified schematic diagram of the pulse input interface circuitry of the primary-side driver 24.

FIG. 4 is a simplified schematic diagram of the pulse input interface circuitry 47 of the primary-side driver 24. The primary-side driver 24 is designed for maximum flexibility which includes the ability to operate with a linear opto, or an AM link in place of the transformer TR2. The Plam pin connects internally to the IC's PWM comparator 46. It can take an AM input from a secondary-side circuit, or it can be used to limit duty cycle. An additional pin (not shown) can provide a buffered, low impedance input for a linear-mode opto coupler 48. It increases the opto's bandwidth by a factor of two or three by reducing the effect of the Miller capacitance of the opto's Darlington.

Figure 5:
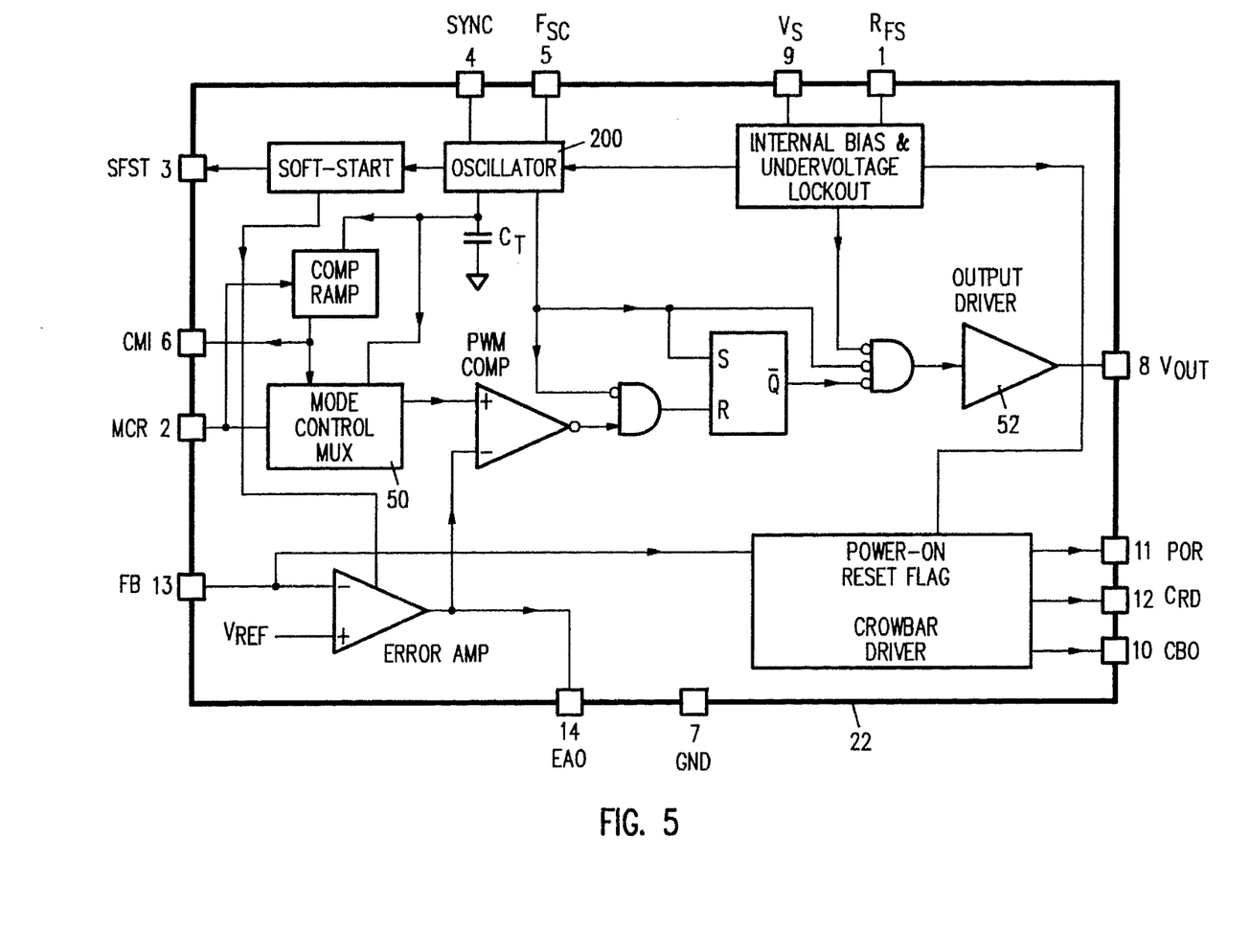
FIG. 5 is a simplified functional block diagram of the secondary-side controller 22.

Referring now to FIG. 5, the secondary-side controller 22 uses a bandgap reference which is 1%+1% curvature corrected and an oscillator which has an internal timing capacitor CT but it requires external resistor R2. Under short-circuit conditions the frequency drops which allows the supply designer to avoid hitting the secondary-side controller's secondary (600 mV) current limit by programming the controller to produce PWM at a lower frequency.

The secondary-side controller 22 can operate the switching regulator in either a voltage or current mode. The MCR pin, which leads to the control multiplexer 50, selects the mode; connects it to the supply rail for voltage mode, to ground via a resistor which sets the ramp compensation, for current mode. If current mode is used a current-sense signal from a current transformer is connected to the CS pin. The output driver 52 is designed to feed the pulse transformer TR2 through a coupling capacitor 54 which blocks do current.

The secondary-side controller 22 monitor circuit (not shown) provides a delayed power-on-reset signal. The circuit's open-collector output provides a valid signal when the supply rail is as low as 1 V. Its threshold is set at −5% of the nominal output voltage. A crowbar output is provided which can fire an SCR if the output voltage Vout is more than 10% above normal.

Referring now to FIGS. 3 and 4, the control pulses from the secondary are coupled in via the PIN pin. To ensure maximum operating speed the pulse interface circuit is very simple, as shown in FIG. 4. Instead of using a comparator, the pulses are coupled via two transistors to the main flip-flop. This approach, together with fast logic circuit in the critical path, yields short input to output propagation delay (typically 30 nsec at turn-on and 30 nsec at turn-off) with a minimal power consumption. The disadvantage is that the pulse input thresholds are essentially ±Vbe, which varies with temperature. This, however, does not cause any problem in the application circuits, since the secondary-side controller 22 has ample output swing and the interface circuit is not sensitive to overdrive.

The current limit circuitry has dual thresholds at 400 mV and 600 mV. The second level current limit activates a timed shut-down controlled by the capacitor on the CSD pin. This feature eliminates the possibility of short circuit run-away. The comparator circuit 30 and 32, used for both current limit levels, use the fast ($f_t$=30 MHz) lateral PNP transistors, available on this process, as level shift devices. This yields a very respectable speed-power product: 110 mW nsec with 30 mV overdrive.

The output voltage's slew-rate during startup is controlled by a soft-start capacitor 41 connected to the CSS pin. The charge current for both the soft-start capacitor 41 and the shut-down time-out capacitor (Csd) 39 are set by the external oscillator timing resistor Rt, 36, and the internal bandgap reference 43. This results in a stable timing that is scaled to the operating frequency. The primary-side driver 24 has an over-voltage shut down input (OVTH) that can be used either to protect the driver 24 from higher than 20 V of voltage on the tertiary winding, or to protect the system from higher than specified off-line supply voltage, depending on how the voltage divider on the OTH pin is connected.

Figure 8:
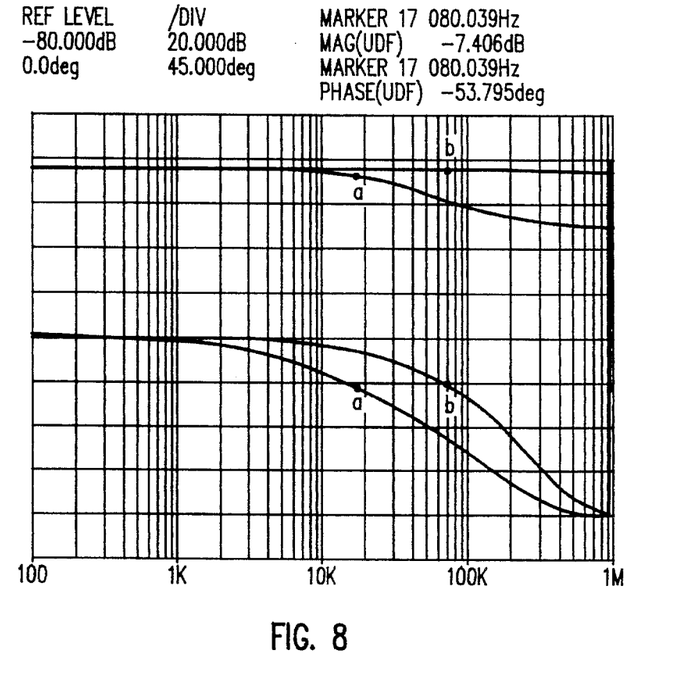
FIG. 8 provides Bode plots of a 1N27 opto-coupler at 2 mA operating point.

FIG. 8 shows the Bode plots of the 1N27 opto-coupler at 2 mA operating point. Traces (a) are the result from the standard circuit, while traces (b) are the result from the buffered circuit used in the primary-side driver 24. The increase in bandwidth is about 5×, quite significant.

Figure 9:
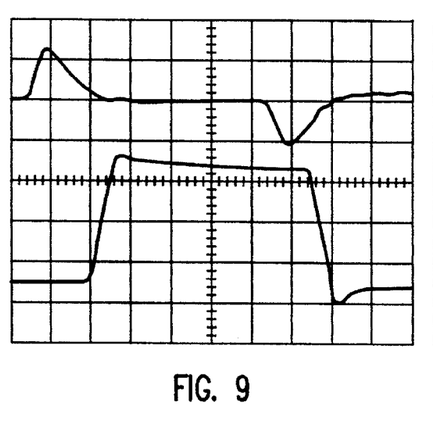
FIG. 9 is a plot illustrating the output waveform of the primary-side driver 24 with a 1 nF load.
Figure 10:
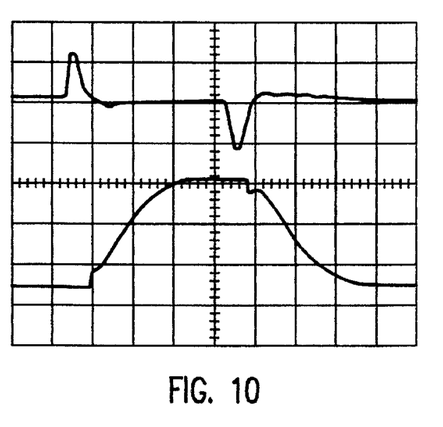
FIG. 10 is a plot illustrating the output waveform of the primary-side driver 24 with a 20 nF load.

The PLAM pin provides an input for AM communication. It also serves as a programmable duty-cycle limit input. FIG. 9 shows the driver's 24 output waveforms driving a 1 nF capacitor at 1 MHz. The top waveform is the input signal of the pulse transformer driving the PIN pin. The second waveform is the output signal. Five percent of duty-cycle was chosen to show the rise and fall time on the same trace. FIG. 10 shows the same waveforms with a 20 nF capacitive load, at 300 kHz.

The secondary-side controller 22 is a full PWM controller, plus an integrated power supply monitor, but exclude an output driver. The block diagram of the controller 22 is shown in FIG. 5. It has a trimmed, curvature corrected 1%+1% bandgap reference. Its oscillator has an internal timing capacitor, and its oscillation frequency is set by a resistor connected to pin RFS. This same resistor also sets up the bias currents of the speed-critical circuit blocks on the chip, optimizing the speed-power product.

Figure 6:
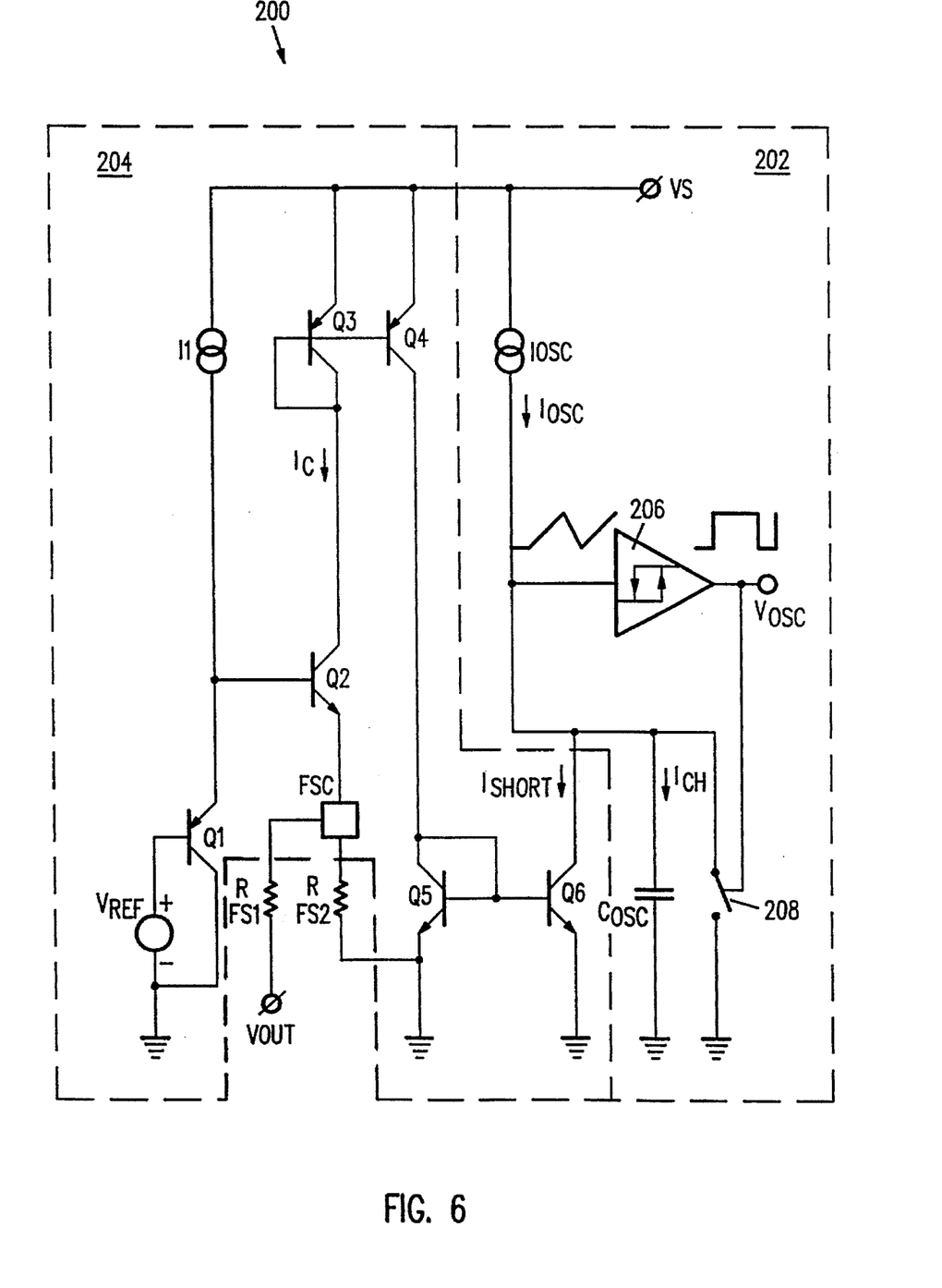
FIG. 6 is a detailed schematic diagram of the oscillator circuit and frequency shift circuit of the secondary-side controller 22.

FIG. 6 illustrates the oscillator circuit 200. The oscillator circuit 200 includes an oscillator 202 and frequency shift circuitry 204. The oscillator 202 output Vosc provides the ramp signal and time base for the PWM pulses that are sent back to the primary driver 24 via the transformer TR2. The purpose of the frequency shift circuitry 204 is to reduce, or "shift" the frequency of the oscillator output Vosc when the output Vout is short-circuited or approaching near short-circuit conditions. The reduction in the frequency of the oscillator output Vosc ultimately results in a reduction in the frequency that the transistor 26 is switched on and off, and, consequently, a reduction in the energy that is transferred through the transformer TR1.

The frequency shift circuitry 204 reduces the frequency of the oscillator 202 in a smooth, continuous, quasi-linear fashion as the output approaches short circuit. There is a threshold below which the frequency shift starts. Both the threshold and the slope of the frequency change vs. output voltage can be externally user-programmed using 2 resistors. This solution gives the user total control over the short circuit current limit, and provides a simpler solution than the prior art above.

The oscillator 202 is a relaxation oscillator. A capacitor is charged and discharged by a current between 2 limit values. Below the programmed threshold the frequency shift circuitry 204 steals a current (that is proportional to the difference of the actual output voltage and the threshold voltage) from the timing capacitor's charge current, reducing the frequency.

The oscillator 202 output Vosc is generated at the output of a Schmitt trigger 206. The input of the Schmitt trigger 206 is connected to a current source Iosc and a capacitor Cosc. The other terminal of the capacitor Cosc is connected to ground. The output of the Schmitt trigger 206 is also used to activate a switch 208 that discharges capacitor Cosc (connects the input of the Schmitt trigger 206) to ground. Switch 208 may be a transistor, or the like.

During operation, the switch 208 is initially open, and the current source Iosc charges the capacitor Cosc. As the capacitor Cosc is charged, the voltage at the input of the Schmitt trigger 206 increases. When the voltage at the input of the Schmitt trigger 206 reaches a high threshold level, the Schmitt trigger 206 is triggered which causes its output Vosc to go high.

The high state of Vosc causes the switch 208 to close. When the switch 208 closes, capacitor Cosc is discharged and the input of the Schmitt trigger 206 follows the voltage across capacitor Cosc as it is discharged to ground. The capacitor Cosc rapidly discharges which decreases the voltage at the input of the Schmitt trigger 206. When the voltage at the input of the Schmitt trigger 206 is decreased down to a low threshold level, the Schmitt trigger 206 is triggered to a low output state which causes its output Vosc to go low. The low state of Vosc causes the switch 208 to open, and the charging/discharging cycle of capacitor Cosc repeats itself.

During normal operating conditions, e.g., when Vout is approximately 5 Volts, and the load current is within the normal operating range, the oscillator output Vosc has a constant frequency. However, as Vout approaches short-circuit conditions, the frequency shift circuitry 204 detects this condition and causes the oscillator 202 to reduce the frequency of Vosc. This is accomplished by "stealing" current from the current supplied by current source Iosc, thus reducing the amount of current available to charge capacitor Cosc. With less charging current available, the rate at which capacitor Cosc is charged is reduced, and therefore the frequency at which Schmitt trigger 206 switches is lowered.

Specifically, the frequency shift circuitry 204 includes a reference voltage source Vref that preferably has a voltage of about 1,235 Volts. Vref is connected between the base of transistor Q1 and ground. The emitter of transistor Q1 is connected to a current source I1. Its collector is connected to ground. The current source I1 is also connected to the base of an npn transistor Q2. The collector of the transistor Q2 is connected to the collector of a diode-connected pnp transistor Q3, and the emitter of transistor Q2 is connected to the frequency shift circuit node Fsc of the secondary controller 22.

The emitter of transistor Q3 is connected to a voltage supply Vs, and the base of transistor Q3 is connected to the base of another pnp transistor Q4 which forms a current mirror with transistor Q3. The collector of transistor Q4 is connected to the collector of a diode-connected npn transistor Q5 that has its emitter connected to ground. Another npn transistor Q6 forms a current mirror with transistor Q5. The collector of transistor Q6 is connected to the input of the Schmitt trigger 206. The circuit as just described causes a current to flow into the collector of transistor Q6 which is proportional to current flowing out of the emitter of transistor Q2.

A resistor Rfs1 is connected between the node Fsc and the voltage output node Vout. Another resistor Rfs2, which is optional, may be connected between the node Fsc and ground. The resistors Rfs1 and Rfs2 are used to program the rate of frequency shift and the threshold voltage to which Vout needs to drop before the frequency shift starts. As will become apparent from the discussion below, optional resistor Rfs2 is used to program the threshold voltage where frequency shift starts.

Assuming that only resistor Rfs1 is utilized and that Rfs2 is omitted, frequency shift will start when the voltage Vout is approximately equal to the reference voltage Vref. Specifically, under normal operating conditions, Vout is approximately equal to 5 Volts. At that level the base-emitter junction of transistor Q2 is reverse-biased so no current flows out of its emitter.

As Vout decreases due to an overload condition, the voltage at the emitter of transistor Q2, which is equal to Vout because no current is yet flowing through resistor Rfs1, also decreases. When Vout decreases to the point where it is approximately equal to Vref, the base-emitter voltage $V_{BE}$ of transistor Q2 will be approximately equal to the emitter-base voltage $V_{EB}$ of transistor $Q_1$. At this point, transistor Q2 begins to conduct current $i_C$ from collector to emitter which results in current flowing through resistor Rfs1.

As Vout decreases further, the emitter voltage of transistor Q2 stays essentially constant which results in an increase in current $i_C$.

Once transistor Q2 begins to conduct current $i_C$, transistor Q3 necessarily conducts current $i_C$. Current mirror transistor Q4 begins to conduct current because its emitter-base voltage is equal to the emitter-base voltage of transistor Q3. The current conducted by transistor Q4 flows through diode-connected transistor Q5 to ground, setting a $V_{BE}$ across the base-emitter of transistor Q5 which is also applied across the base-emitter to transistor Q6. Because transistor Q6 forms a current mirror with transistor Q5, transistor Q6 also conducts a current Ishort. As is well known, Ishort will be proportional to $i_C$ depending upon the relative sizes of the base-emitter junction of transistors Q3, Q4, Q5 and Q6.

When transistor Q6 begins to conduct current Ishort, this current is supplied from the current source Iosc. Ishort is part of the current that would have been used to charge capacitor Cosc. Thus, less current flows to capacitor Cosc which results in it being charged more slowly. Because capacitor Cosc does not charge as rapidly, the Schmitt trigger 206 does not switch from high to low as rapidly as before the short-circuit condition. The slower switching of the Schmitt trigger 206 results in the frequency of Vosc being reduced.

If optional resistor Rfs2 is connected between node Fsc and ground, resistors Rfs1 and Rfs2 function as a voltage divider for Vout. Thus, even when Vout is 5 Volts, a current flows through resistors Rfs1 and Rfs2, and the voltage at node Fsc will be a selected fraction of Vout.

The voltage across Rfs2 will be the voltage at the emitter of transistor Q2. The values of resistors Rfs1 and Rfs2 will be chosen such that when Vout is 5 Volts, the emitter voltage of Q2 will be high enough such that the base-emitter junction of transistor Q2 is reverse biased. Transistor Q2 does not conduct current when its base-emitter junction is reverse biased.

As Vout decreases, the voltage across resistor Rfs2, and thus the emitter voltage of transistor Q2, also decrease. Eventually, the emitter voltage of transistor Q2 will decrease enough such that the base-emitter junction of transistor Q2 is forward biased. Once transistor Q2 begins to conduct current, the remainder of the circuitry functions the same as discussed above.

The advantage of using resistor Rfs2 is that the level to which Vout must drop in order to initiate the frequency shift can be programmed to be other than Vref (as is the case when only resistor Rfs1 is used).

During output short circuit, the chip's operating frequency can be reduced in a gradual programmable way. The frequency shift and the threshold where the frequency shift starts can be programmed by two external resistors, Rfs1 and Rfs2, connected to the Fsc pin. As long as the Rfs1-Rfs2 divider holds the emitter of Q2 higher than the internal reference voltage, Vref, the oscillator operates at its nominal frequency. If, due to overload, Vout drops and Vout*(Rfs1/(Rfs1-Rfs2))<Vref, a current to flow trough Q2. 1/10th of this current is subtracted from the timing capacitor's charge current, decreasing the oscillator frequency. The breakpoint, where the frequency-shift starts is programmed by the ratio of the two resistors, while the value of the shift is set by their absolute value, according to the following formulas:

$$I_{OSC} = .25 \left( \frac{V_{REF}}{R_{FS}} \right)$$

$$F_{OSC}(V_O) = [I_{OSC} - 0.1 \left( \frac{V_{REF}}{R_{FS1}} + \frac{V_{REF}}{R_{FS2}} + \frac{V_O}{R_{FS1}} \right)] \left( \frac{1}{C_{OSC} * V_{REF}} \right) \quad (4.2)$$

This short circuit frequency shift feature prevents the system from reaching the second current limit of the Primary Side Driver chip during a temporary short circuit condition, yielding a straight short circuit current limit. Under a protracted output short circuit, the supply voltage of the second side controller gradually disappears and the primary side second level current limit circuit is triggered in a runaway condition. This initiates a time-out, yielding a foldback short circuit characteristic.

Figure 7:
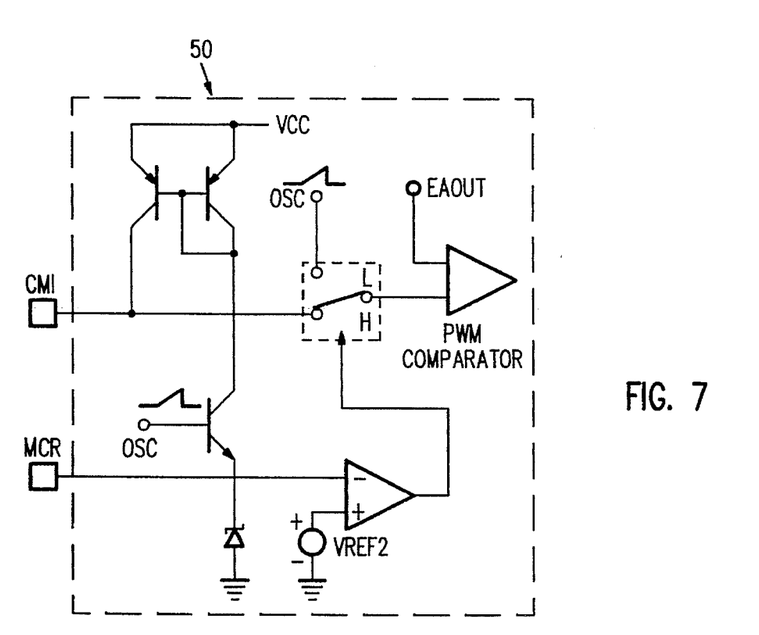
FIG. 7 is a simplified functional diagram of the mode control circuitry 50 of secondary-side controller 22.

The operating mode is controlled by the MCR pin. If this pin is tied to the supply voltage the chip operates in voltage-mode control. On the other hand, both current-mode control and charge-mode control operation is selected by pulling the MCR pin to ground via a resistor. The resistor also sets the slope of the compensating ramp which is needed to stabilize the converter in current-mode above 50% duty-cycle, and in charge-mode below a certain input voltage. FIG. 7 shows the simplified internal circuitry connected to the MCR pin. The mode comparator senses the MCR pin's voltage and sets the mode control multiplexer (see FIG. 5). In current or charge-mode, control Rcr sets the slope of a current that flows out of the CMI current sense input pin. The compensating ramp's slope can be scaled by a resistor, Rf, connected between the CMI pin and the terminating resistor (Rs) of the current sense transformer. Resistor Rf also serves as a component for the leading edge spike RC filter (Rf-Cf). The slope of the compensating ramp is given by the following equation:

$$\frac{\Delta I_{CMI}}{\Delta t} = \frac{27.2\,E-3}{R_{FS} * R_{CR}} \quad (4.3)$$

Figure 11A:
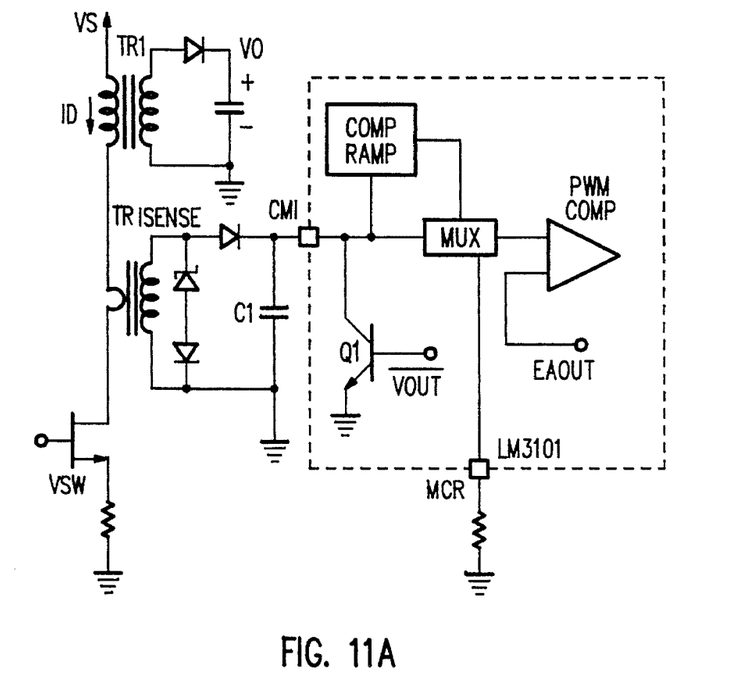
FIG. 11A is a schematic diagram of the integrating current sense circuitry of the secondary-side controller 22, and FIG. 11B are plots illustrating the operation of the intergrating current sense circuitry.
Figure 11B:
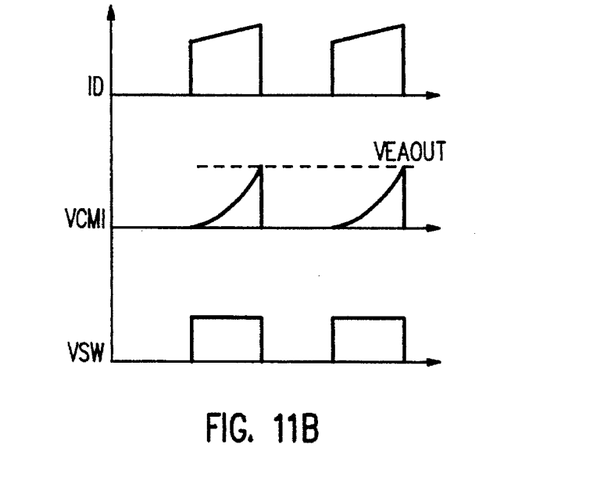

Under charge-mode control the current sense transformer drives a capacitor that integrates the sensed switch current on a cycle-by-cycle basis. FIG. 11A shows the integrating current sense circuitry and the simplified details of the associated internal circuitry of the secondary-side controller 22. Q1 discharges the C1 integrating capacitor in every switch cycle during the switch's offtime. Q1 is also active in current-mode, although it was not shown in FIG. 7. The charge-mode control yields the fastest possible average current control loop. The secondary-side controller 22 is the first commercially available chip to provide the option of charge-mode control.

The monitor section is shown in the right lower corner of the block diagram shown in FIG. 5. Two monitor functions are provided. The first is power-on reset with programmable delay. The reset pin, POR, is an open collector, pulled up by an external resistor. It is valid down to 1 V supply voltage, sinking 1.6 mA of current. The reset delay can be programmed with an external capacitor connected to the $C_{RD}$ pin. The practical delay ranges from 10 usec to 5 msec. The reset threshold is internally fixed at 95% of the nominal output voltage. The second monitor function is a crowbar driver output. If the output voltage higher than 120% of the nominal value (due to loss of control), the CBO pin can fire an external 5 CR that shorts the output of the regulator, saving the $I_C$s connected to it. The CBO pin can supply more than 200 mA of current for the SCR's trigger input.

Referring back to FIG. 2, the output voltage of the converter is 5 V at 10 A max., the input voltage range is 80 V AC to 132 V AC, which corresponds to a 113 V to 186 V DC range for the converter. FIG. 2 does not show the input diode bridge and EMI filter for simplicity, they are included on the actual test circuit. The converter operates at 500 kHz nominal frequency with 78% efficiency. The main transformer, TR1 is Pulse Engineering PE 6823, with 40 uH primary inductance and 1 uH primary leakage inductance. It is surface mountable.

The primary-side driver 24 is supplied from the tertiary winding the in traditional way. The nominal voltage of the tertiary output is 12.5 V. The 3 uH inductor L1 averages out the 200 nsec long voltage spike on the tertiary winding after the FET turns off. This spike is caused by the secondary leakage and wiring inductance and the high dI/dT of the secondary winding when an output diode SR1606 turns on. The spike can be easily 3 V at 10 A load, even with very careful secondary side board layout. This spike transformed by the 2.5:1 secondary to tertiary turns ratio would raise the driver's supply voltage to 20 V (the max operating limit) if L1 was not used. Increasing the load to the 12 A current limit the tertiary rectified voltage would exceed the chip's max supply voltage rating. Inserting L1, in series with the tertiary diode, integrates the spike, yielding a 17.5 V maximum rectified tertiary voltage.

The rest of the control circuit on the primary-side is standard. The primary-secondary communication is facilitated by transformer TR2, the pulse communication transformer. It is wound on a 40200TCW 2.5 mm diameter toroid core (ur=10000), manufactured by Magnetics, Inc. Both the primary and the secondary have 2 turns, yielding a 7 uH primary inductance. The secondary winding is wound by triple isolated Rubadue wire to provide 2500 V primary to secondary isolation. The primary of transformer TR2 is driven by the secondary-side controller 22 via a 100 pF DC blocking capacitor. The secondary-side controller 22 is supplied from the output voltage through a diode 1N5818. The diode ensures that the chip's supply voltage does not immediately collapse in a temporary output short circuit condition. Rfs sets the operating frequency to 500 kHz. The free running frequency of the primary chip is set to the same nominal value by Rt and Ct.

Figure 12:
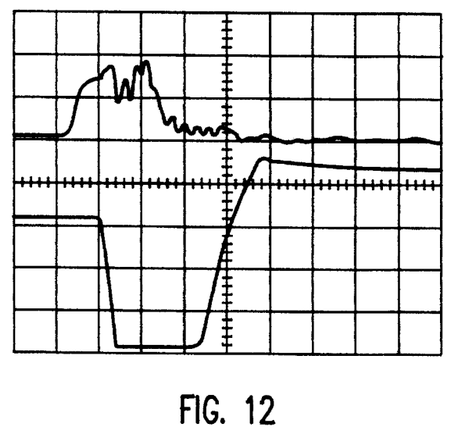
FIG. 12 is a plot of the output of the off-line voltage converter of FIG. 2 under light load.

FIG. 12 illustrates the dynamic range of the converter. It shows the output voltage of the secondary-side controller 22 $I_C$ and the Drain voltage of the power MOSFET 26 under light load operation, yielding 5% duty-cycle.

Figure 13:
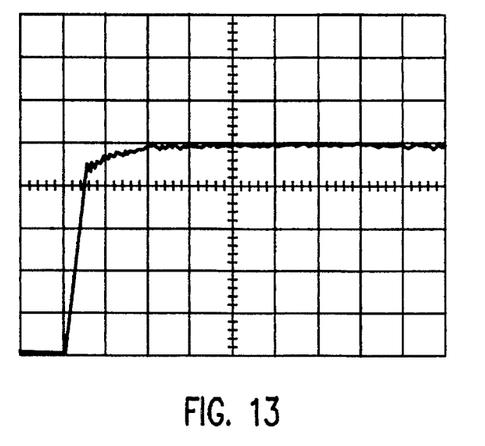
FIG. 13 is a plot of the startup transient of the off-line voltage converter of FIG. 2 under maximum load.
Figure 14:
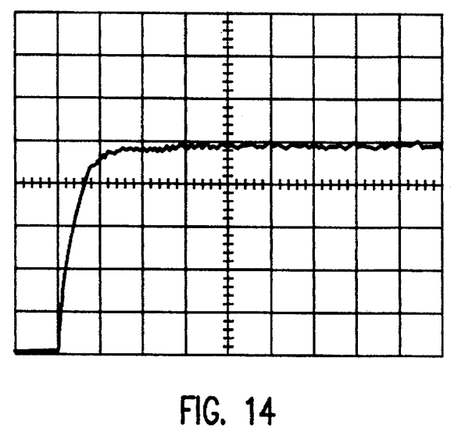
FIG. 14 is a plot of the startup transient of the off-line voltage converter of FIG. 2 under light load.

At start-up, the secondary soft-start capacitor, Cs, is not charged, and the SFT pin pulls down the chip's reference voltage to 0.99 V, from the nominal 1,242 V, with the resistor values shown. The reference voltage gradually increases during the startup transient depending on the value of Cs. This feature ensures that the error amplifier of the secondary-side controller 22 is in its linear active region before the output voltage reaches its nominal value, yielding a smooth output startup waveform without overshoot. FIG. 13 shows the output voltage at startup with a 10 A maximum load, while FIG. 14 shows the startup transient at a light 100 mA load current. In both cases the startup is well behaved and monotonous.

Figure 15:
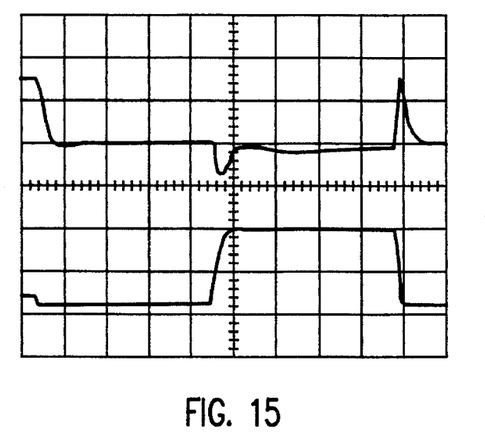
FIG. 15 is a plot of the load transient response of the off-line voltage converter of FIG. 2.

The converter's line-regulation is 0.002%/V while load-regulation for a 100 mA to 10 A load change is 5 mV. The control loop of the converter has a 331 kHz crossover frequency at nominal input voltage and full load. FIG. 15 shows the output load transient response with a load change from 1 A to 10 A. The maximum excursion is about 400 mV, the settling time to within 2% is below 15 usec. The small output LC filter brings down the output ripple voltage to 50 mV.

In summary, a 1 MHz off-line PWM controller chipset was described that uses pulse communication between the secondary-side controller 22 and primary-side driver 24 chips. The primary-side driver 24 exhibits very fast gate drive circuitry yielding 11 nsec rise and fall time with 1 nF load, without shoot-through. The secondary-side controller 22 provides the option of voltage, current, or charge-mode control in a pin programmable manner. Its programmable ramped up reference voltage feature ensures that there is no output voltage overshoot during the turn-on transient. Output voltage precision is maintained by the trimmed 1% bandgap reference. The customary supervisory functions are also provided on-chip. The chipset 22 and 24 was demonstrated in a 50 W off-line flyback converter application.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A controller for use in a switching power supply having a power switch, the controller comprising:

an oscillator for generating pulse width modulation (PWM) pulses having a predetermined frequency for activating the power switch in the switching power supply, the oscillator including a first capacitor which is charged and discharged in order to generate the PWM pulses, the first capacitor being charged at a charging rate by a first current;

frequency shift means for gradually shifting the frequency of the PWM pulses at a shift rate in response to an output voltage of the switching power supply decreasing to below a threshold level, the frequency shift means including circuitry which diverts a portion of the first current away from the first capacitor in order to reduce the charging rate of the first capacitor in order to shift the frequency of the PWM pulses; and programming circuitry for programming the shift rate at which the frequency of the PWM pulses is shifted;

wherein the circuitry which diverts a portion of the first current away from the first capacitor includes:

a first transistor for conducting the portion of the first current; and current mirror circuitry for switching the first transistor into a conducting state;

wherein the frequency shift means further includes:

a reference voltage source; and a second transistor having its base connected to the reference voltage source and its collector connected to the current mirror circuitry;

wherein the programming circuitry further includes:

a first resistor for setting the shift rate at which the frequency of the PWM pulses is shifted, the first resistor being connected between the emitter of the second transistor and the output of the switching power supply;

wherein, the second transistor is switched into a conducting state when the output voltage of the switching power supply decreases below the threshold level.

2. A controller in accordance with claim 1, wherein the programming circuitry further comprises:

a second resistor for setting the threshold voltage which the voltage at the output of the switching power supply must decrease below for the frequency shift circuit to begin shifting the frequency of the PWM pulses, the second resistor being connected between the emitter of the second transistor and ground.

3. A controller for use in a switching power supply having a power switch, the controller comprising:

an oscillator for generating pulse width modulation (PWM) pulses having a frequency for use in activating the power switch in the switching power supply, the oscillator including a Schmitt trigger having its input connected to a first current source and to a first capacitor, the first current source capable of generating a first current for charging the first capacitor at a charging rate in order to increase a voltage at the input of the Schmitt trigger in order to trigger the Schmitt trigger;

a frequency shift circuit for shifting the frequency of the PWM pulses at a shift rate in response to the voltage at an output of the switching power supply decreasing below a threshold level, the frequency shift circuit including a first transistor connected to the input of the Schmitt trigger to divert a portion of the first current to ground to prevent the portion of the first current from charging the first capacitor in order to reduce the charging rate of the first capacitor in order to shift the frequency of the PWM pulses, the frequency shift circuit also including current mirror circuitry for switching the first transistor into a conducting state when the output voltage of the switching power supply decreases below the threshold level; and programming circuitry for programming the shift rate at which the frequency of the PWM pulses is shifted;

wherein the frequency shift circuit further comprises:

a reference voltage source; and a second transistor having its base connected to the reference voltage source and its collector connected to the current mirror circuitry;

wherein the programming circuitry includes:

a first resistor for setting the shift rate at which the frequency of the PWM pulses is shifted, the first resistor being connected between the emitter of the second transistor and the output of the switching power supply;

wherein, the second transistor is switched into a conducting state when the output voltage of the switching power supply decreases below the threshold level.

4. A controller in accordance with claim 3, wherein the programming circuitry further comprises:

a second resistor for setting the threshold voltage which the voltage at the output of the switching power supply must decrease below for the frequency shift circuit to begin shifting the frequency of the PWM pulses, the second resistor being connected between the emitter of the second transistor and ground.

* * * * *